US012711924B2

(12) United States Patent
Hwang

(10) Patent No.: US 12,711,924 B2
(45) Date of Patent: Aug. 18, 2026

(54) SCAN DRIVER AND DISPLAY DEVICE INCLUDING THE SAME AND AN ELECTRONIC DEVICE

(71) Applicant: Samsung Display Co., LTD., Yongin-si (KR)

(72) Inventor: Jung Hwan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/091,146

(22) Filed: Mar. 26, 2025

(65) Prior Publication Data

US 2026/0045223 A1 Feb. 12, 2026

(30) Foreign Application Priority Data

Aug. 12, 2024 (KR) ........................ 10-2024-0107550

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0842* (2013.01); *G09G 2310/0286* (2013.01); *G09G 2310/08* (2013.01)

(58) Field of Classification Search
CPC ............... G09G 3/3266; G09G 3/3233; G09G 2300/0842; G09G 2310/0286; G09G 2310/08
See application file for complete search history.

(56) References Cited

U.S. PATENT DOCUMENTS

| | | | | |
|---|---|---|---|---|
| 10,546,520 | B2 | 1/2020 | Noh et al. | |
| 2021/0201770 | A1 * | 7/2021 | Park | G09G 3/32 |
| 2024/0203361 | A1 * | 6/2024 | Meng | G09G 3/3275 |
| 2024/0257768 | A1 * | 8/2024 | Yoon | G09G 3/3266 |

* cited by examiner

*Primary Examiner* — Nitin Patel
*Assistant Examiner* — Amen W Bogale
(74) *Attorney, Agent, or Firm* — Innovation Counsel LLP

(57) ABSTRACT

A scan driver includes a first scan driving circuit sequentially outputting gate scan signals to scan signal lines during an active period, wherein the first scan driving circuit includes: an n-th stage supplying a gate-on voltage to a pull-up node in response to a first gate control signal of a display driver circuit; output control parts sharing a pull-up node of the n-th stage and sequentially outputting the gate scan signals during an enable period in which the gate-on voltage is supplied to the pull-up node; at least one carry output part sharing the pull-up node of the n-th stage and outputting at least one carry signal during the enable period; and at least one node voltage control part controlling a voltage magnitude of the gate-on voltage charged to the pull-up node during the enable period in response to a pull-up control signal of the display driving circuit.

16 Claims, 10 Drawing Sheets

SCAN DRIVER AND DISPLAY DEVICE INCLUDING THE SAME AND AN ELECTRONIC DEVICE

CROSS-REFERENCE TO RELATED APPLICATION

This application claims priority to and benefits of Korean Patent Application No. 10-2024-0107550 under 35 U.S.C. 119, filed on Aug. 12, 2024 in the Korean Intellectual Property Office, the entire contents of which are incorporated herein by reference.

BACKGROUND

1. Technical Field

Embodiments relate to a scan driver and a display device including the scan driver and an electronic device.

2. Description of the Related Art

As an information society develops, the demand for a display device for displaying an image is increasing in various forms. For example, display devices are applied to various electronic devices such as smartphones, digital cameras, laptop computers, navigation devices, and smart televisions.

The display device may be a flat panel display device such as a liquid crystal display device, a field emission display device, an organic light emitting display device, or the like. Among the flat panel display devices, the organic light emitting display device may include a light emitting element in which each of the pixels of a display panel may emit light by itself, thereby displaying an image without a backlight unit (or backlight part) providing the light to the display panel.

The display device may include a display panel having data lines, scan signal lines, and sensing signal lines, as well as pixels connected to the data lines, the scan signal lines, and the sensing signal lines arranged in a matrix structure. For example, the display device may further include a scan driver for supplying scan signals to the scan signal lines, a sensing driver for supplying sensing signals to the sensing signal lines, and a data driver for supplying data voltages to the data lines.

The scan driver and the sensing driver are formed in a non-display area of the display panel, and according to the size and arrangement area of the scan driver and the sensing driver, an area of a bezel area, which is a non-image display area, may increase or decrease.

SUMMARY

Aspects of the disclosure provide a scan driver that reduces the number of stage circuits formed in each of the scan driver and the sensing driver, and enables multiple output circuits to operate by sharing pull-up nodes of each stage circuit, and a display device including the scan driver.

Aspects of the disclosure also provide a scan driver that may control an enable voltage (or charging voltage) to be supplied and maintained at a stable level to a pull-up node of each stage circuit, and a display device including the same.

However, aspects of the disclosure are not restricted to those set forth herein. The above and other aspects of the disclosure will become more apparent to one of ordinary skill in the art to which the disclosure pertains by referencing the detailed description of the disclosure given below.

According to an aspect of the disclosure, there is provided a scan driver including a first scan driving circuit that sequentially outputs gate scan signals to scan signal lines during an active period for a frame, wherein the first scan driving circuit may include: an n-th stage that supplies a gate-on voltage to a pull-up node in response to a first gate control signal of a display driver circuit; a plurality of output control parts that share a pull-up node of the n-th stage and sequentially output the gate scan signals during an enable period in which the gate-on voltage is supplied to the pull-up node; at least one carry output part that shares the pull-up node of the n-th stage and outputs at least one carry signal during the enable period; and at least one node voltage control part that controls a voltage magnitude of the gate-on voltage charged to the pull-up node during the enable period in response to a pull-up control signal of the display driving circuit.

The scan driver may include: a second scan driving circuit that sequentially supplies sensing control signals to the sensing control lines during the active period for the frame based on a second gate control signal from the display driving circuit, wherein the second scan driving circuit may sequentially supply the sensing control signals to the sensing control lines arranged for each horizontal line to control a pixel driving voltage of each pixel for each horizontal line to be output to a data driving circuit.

A plurality of n-th stages may be cascadedly connected to each other, and the plurality of output control parts may be electrically connected to the pull-up node of the n-th stage to electrically share the pull-up node, and may be connected in a series or parallel structure to the pull-up node of the n-th stage.

First to fourth output control parts of the plurality of output control parts may sequentially output n-th to n+3-th gate scan signals to n-th to n+3-th gate lines, in response to first to fourth line select signals sequentially input in parts of at least one horizontal period during the enable period of the pull-up node.

Each of the first to fourth output control parts may include a pull-up transistor and a pull-down transistor, and the pull-up transistor may be turned on by the gate-on voltage of the pull-up node and outputs at least one line select signal input to a line select signal input terminal to each scan signal line.

The at least one carry output part may be electrically connected to the pull-up node of the n-th stage and electrically shares the pull-up node, and may output the at least one carry signal to stages disposed at a front end and a rear end in response to a carry select signal selectively input from the display driving circuit during the enable period of the pull-up node.

The at least one carry output part may include a pull-up transistor and a pull-down transistor, and the pull-up transistor may be turned on by the gate-on voltage of the pull-up node and outputs the carry select signal input to the carry select signal input terminal to front-end and rear-end stages of a previous stage and a next stage.

The at least one node voltage control part may be electrically connected to the pull-up node of the n-th stage and electrically shares the pull-up node, and may adjust the voltage magnitude of the pull-up node according to a change in voltage magnitude of the pull-up control signal input from the display driving circuit during the enable period of the pull-up node.

The at least one node voltage control part may include: a pull-up control transistor that is turned on by the gate-on voltage of the pull-up node and outputs a pull-up control signal input to a first electrode to a second electrode; and a pull-up capacitor having a first side electrode connected to the pull-up node and a second side electrode connected to the second electrode of the pull-up control transistor in a parallel structure with the pull-up control transistor.

The pull-up control transistor may supply the pull-up control signal from the display driving circuit to the second electrode of the pull-up capacitor, in case that the pull-up control transistor is turned on by the gate-on voltage of the pull-up node, and the pull-up capacitor may vary or maintain the voltage magnitude of the pull-up node connected to the first side electrode according to the voltage magnitude of the pull-up control signal input to the second side electrode.

The display driving circuit may generate the pull-up control signal with a voltage magnitude substantially equal to a selected magnitude of the gate-on voltage and may supply the generated pull-up control signal to the pull-up control transistor during the enable period of the pull-up node, and the pull-up capacitor may vary or maintains the voltage magnitude of the pull-up node according to the pull-up control signal having a same voltage magnitude as the magnitude of the gate-on voltage input to the second side electrode.

The display driving circuit may vary the pull-up control signal to a first voltage magnitude greater than the selected magnitude of the gate-on voltage and a second voltage magnitude substantially equal to the selected magnitude of the gate-on voltage and may supply the varied pull-up signal to the pull-up control transistor during the enable period of the pull-up node, and the pull-up capacitor may control the voltage magnitude of the pull-up node according to the first voltage magnitude and the second voltage magnitude of the pull-up control signal input to the second side electrode.

According to another aspect of the disclosure, there is provided a display device including: a plurality of pixels arranged in a display area of a display panel; a display driving circuit that controls data voltages supplied to the plurality of pixels and image display timing of the pixels; and a scan driver that drives scan signal lines and sensing control lines of the display panel during an active period for a frame, wherein the scan driver may include a first scan driving circuit that sequentially outputs gate scan signals to scan signal lines during an active period for the frame.

The first scan driving circuit may include: an n-th stage that supplies a gate-on voltage to a pull-up node in response to a first gate control signal of a display driver circuit; a plurality of output control parts that share a pull-up node of the n-th stage and sequentially output the gate scan signals during an enable period in which the gate-on voltage is supplied to the pull-up node; at least one carry output part that shares the pull-up node of the n-th stage and outputs at least one carry signal during the enable period; and at least one node voltage control part that controls a voltage magnitude of the gate-on voltage charged to the pull-up node during the enable period in response to a pull-up control signal of the display driving circuit.

A plurality of n-th stages may be cascadedly connected to each other, and the plurality of output control parts may be electrically connected to the pull-up node of the n-th stage to electrically share the pull-up node, and may be connected in a series or parallel structure to the pull-up node of the n-th stage.

First to fourth output control parts of the plurality of output control parts may sequentially output n-th to n+3-th gate scan signals to n-th to n+3-th gate lines, in response to first to fourth line select signals sequentially input in parts of at least one horizontal period during the enable period of the pull-up node.

The at least one node voltage control part may be electrically connected to the pull-up node of the n-th stage and electrically shares the pull-up node, and may adjust the voltage magnitude of the pull-up node according to a change in voltage magnitude of the pull-up control signal input from the display driving circuit during the enable period of the pull-up node.

The at least one node voltage control part may include: a pull-up control transistor that is turned on by the gate-on voltage of the pull-up node and outputs a pull-up control signal input to a first electrode to a second electrode; and a pull-up capacitor having a first side electrode connected to the pull-up node and a second side electrode connected to the second electrode of the pull-up control transistor in a parallel structure with the pull-up control transistor.

The pull-up control transistor may supply the pull-up control signal from the display driving circuit to the second electrode of the pull-up capacitor, in case that turned on by the gate-on voltage of the pull-up node, and the pull-up capacitor may vary or maintain the voltage magnitude of the pull-up node connected to the first side electrode according to the voltage magnitude of the pull-up control signal input to the second side electrode.

The display driving circuit may generate the pull-up control signal with a voltage magnitude substantially equal to a selected magnitude of the gate-on voltage and may supply the generated pull-up control signal to the pull-up control transistor during the enable period of the pull-up node, and the pull-up capacitor may vary or maintain the voltage magnitude of the pull-up node according to the pull-up control signal having a same voltage magnitude as the magnitude of the gate-on voltage input to the second side electrode.

According to an aspect of the disclosure, there is provided an electronic device including a display device, wherein the display device includes a plurality of pixels arranged in a display area of a display panel, a display driving circuit that controls data voltages supplied to the plurality of pixels and image display timing of the pixels, and a scan driver driving scan signal lines and sensing control lines of the display panel during an active period for a frame, wherein the scan driver may include a first scan driving circuit that sequentially outputs gate scan signals to scan signal lines during an active period for the frame, and the first scan driving circuit may include an n-th stage that supplies a gate-on voltage to a pull-up node in response to a first gate control signal of a display driver circuit, a plurality of output control parts that share a pull-up node of the n-th stage and sequentially output the gate scan signals during an enable period in which the gate-on voltage is supplied to the pull-up node, at least one carry output part that shares the pull-up node of the n-th stage and outputs at least one carry signal during the enable period, and at least one node voltage control part that controls a voltage magnitude of the gate-on voltage charged to the pull-up node during the enable period in response to a pull-up control signal of the display driving circuit.

According to the scan driver and the display device including the scan driver according to the embodiments, the number of stage circuits may be reduced by improving multiple output circuits to operate by sharing the pull-up node of each stage circuit, thereby reducing the area of the bezel area (or image non-display area) in which the scan driver and the sensing driver are formed. Accordingly, the bezel area may be slimly applied even to large display devices.

Further, according to the scan driver and the display device including the same according to the embodiments, the voltage levels of the scan signals and the sensing signals may be stably maintained by controlling the enable voltage (or charging voltage) to be supplied and maintained at a stable level to the pull-up node of each stage circuit. Accordingly, it is possible to prevent degradation of image quality due to changes in the voltage level of the scan signals and the sensing signals and improve user satisfaction.

However, the effects of the embodiments are not restricted to the one set forth herein. The above and other effects of the embodiments will become more apparent to one of daily skill in the art to which the embodiments pertain by referencing the claims.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
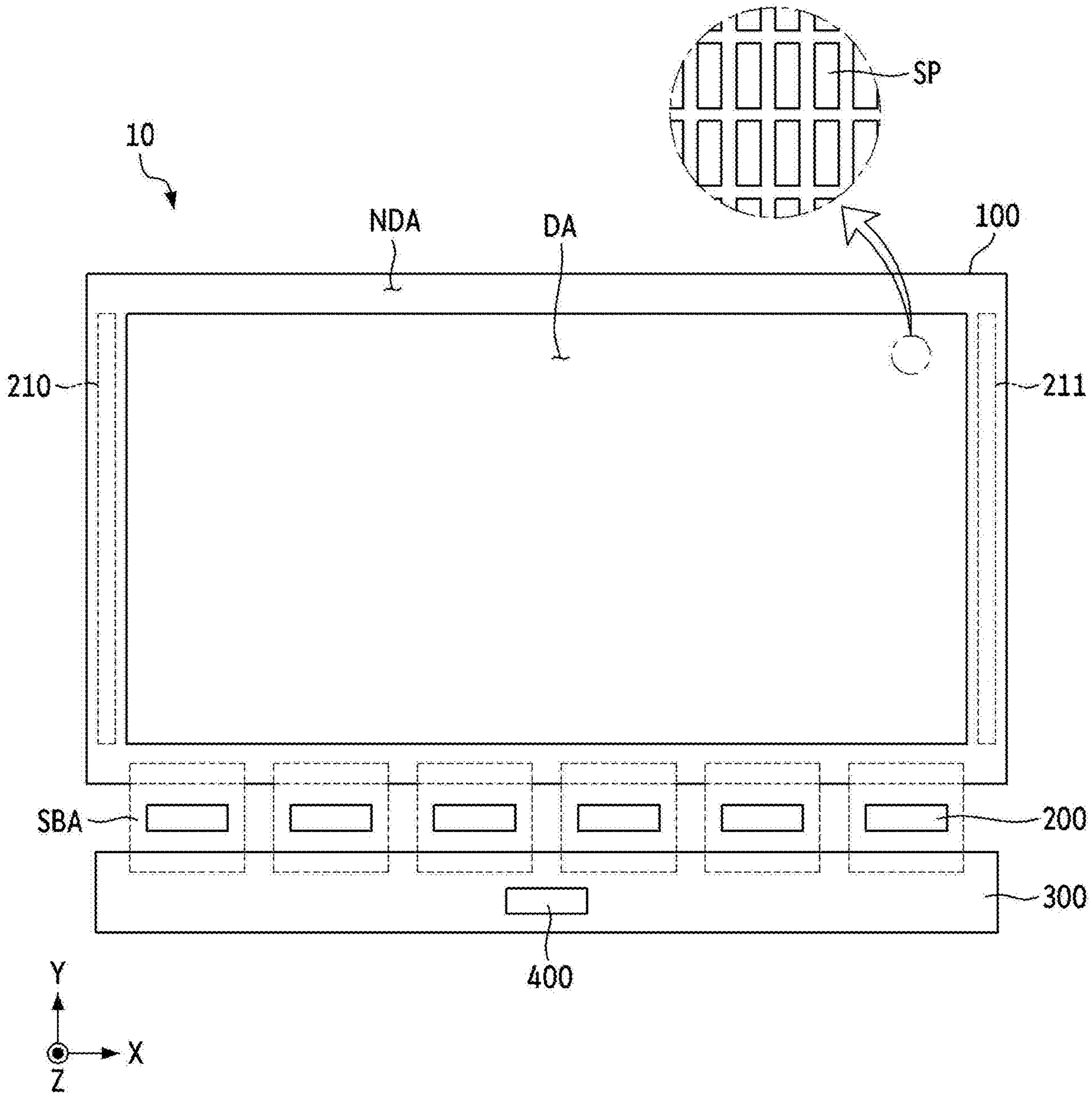
FIG. 1 is a schematic plan view illustrating a configuration of a display device according to an embodiment.

In the following description, for the purposes of explanation, numerous specific details are set forth in order to provide a thorough understanding of various embodiments or implementations of the invention. As used herein, "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the axis of the first direction DR1, the axis of the second direction DR2, and the axis of the third direction DR3 are not limited to three axes of a rectangular coordinate system, such as the X, Y, and Z-axes, and may be interpreted in a broader sense. For example, the axis of the first direction DR1, the axis of the second direction DR2, and the axis of the third direction DR3 may be perpendicular to one another, or may represent different directions that are not perpendicular to one another. For the purposes of this disclosure, "at least one of A and B" may be understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above"

the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Hereinafter, specific embodiments will be described with reference to the accompanying drawings.

Figure 2:
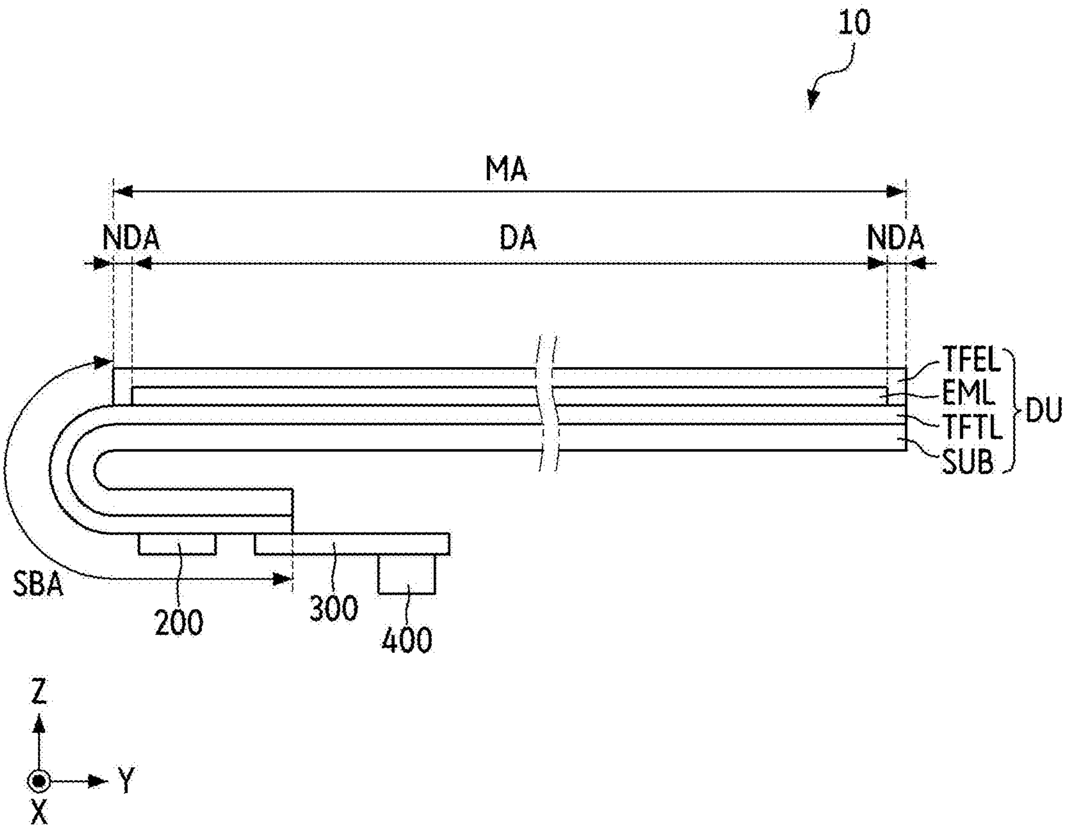
FIG. 2 is a schematic side cross-sectional view of the display device of FIG. 1.

FIG. 1 is a schematic plan view illustrating a configuration of a display device according to an embodiment. FIG. 2 is a schematic side cross-sectional view of the display device of FIG. 1.

Referring to FIGS. 1 and 2, a display device 10 according to an embodiment may be applied to a large image display device such as a television, a laptop, a monitor, a billboard, or Internet of Things (IOT). For example, the display device 10 according to an embodiment may also be applied to portable electronic devices such as a tablet personal computer (PC), a portable multimedia player (PMP), a navigation device, an ultra mobile PC (UMPC), an e-book, an e-notebook, a mobile phone, a smart phone, a mobile communication terminal, etc.

The display device 10 according to an embodiment may be variously classified according to a display method. For example, the display device 10 may be classified into and implemented as a micro LED display device (micro-LED), a nano LED display device (nano-LED), a liquid crystal display device (LCD), a plasma display device (PDP), a field emission display device (FED), an electrophoretic display device (EPD), an organic light emitting diode display device (OLED), an inorganic EL, a quantum dot emitting display device (QED), etc. Hereinafter, an organic light emitting diode display (OLED) will be described as an example of the display device 10 according to an embodiment, and unless a special distinction is required, the organic light emitting diode display (OLED) applied to the embodiment will be referred to as the display device 10. The display device 10 according to the embodiment is not limited to the organic light emitting diode display (OLED), and other display devices listed above or known in the art may be applied within the scope of sharing technical spirits.

The display device 10 according to an embodiment may have a rectangular shape, a square shape, a circular shape, an elliptical shape, or a quadrate shape in plan view. For example, in case that the display device 10 is a large image display device such as a monitor, a television, or a laptop, the display device 10 may have a rectangular shape having long sides positioned in a horizontal direction. However, embodiments are not limited thereto, and in case that the display device 10 is applied to a mobile device such as a tablet PC, the long sides may be positioned in a vertical direction, and the display device 10 may be rotatably installed, such that the long sides may also be variably positioned in the horizontal or vertical direction.

The display device 10 may include a display panel 100, a scan driver, a data driving circuit 200, a circuit board 300, and a display driving circuit 400. For example, the scan driver may include first and second scan driving circuits 210 and 211. For example, the display device 10 may further include a touch sensing unit (or touch sensing part), etc. formed in a front direction of the display panel 100.

For example, the display panel 100 of the display device 10 may include a display unit (or display part) DU for displaying an image, and the touch sensing unit for sensing a touch of a body portion such as a finger and an electronic pen may be disposed on the display panel 100. The display unit DU of the display panel 100 may include pixels SP and display an image through the plurality of pixels SP. For example, the touch sensing unit may be mounted on a front portion of the display panel 100 or may be integral with the display panel 100. The display unit DU of the display panel 100 may include a substrate SUB, a thin-film transistor layer TFTL, a light emitting element layer EML, and a thin-film encapsulation layer TFEL.

The first scan driving circuit 210 may supply a gate scan signal to pixels SP for each horizontal line through gate lines for each horizontal line of the display unit DU based on a first gate control signal from the display driving circuit 400. The first scan driving circuit 210 may sequentially supply gate scan signals to the gate lines for each horizontal line to sequentially drive the pixels SP for each horizontal line.

The second scan driving circuit 211 may supply sensing control signals to the pixels SP for each horizontal line through sensing control lines for each horizontal line of the display unit DU based on a second gate control signal from the display driving circuit 400. The second scan driving circuit 211 may sequentially supply the sensing control signals to the sensing control lines for each horizontal line to control a pixel driving voltage of each pixel SP for each horizontal line to be output to the data driving circuit 200.

The data driving circuit 200 may include data driving integrated circuits. The data driving circuit 200 may include a data driver 201 and a display driver 202. The data driving circuit 200 may output data voltages according to image data to the pixels SP of the display unit DU based on a data driving control signal from the display driving circuit 400. For example, the data driving integrated circuits may supply the data voltages to the data lines connected to each pixel SP in units of horizontal lines for each horizontal cycle. For example, the data driving circuit 200 may supply a compensation data voltage to each pixel SP by receiving a pixel driving voltage of each pixel SP and performing data compensation processing according to the magnitude of the pixel driving voltage.

The display driving circuit 400 may operate as a main processor or may be integral with the main processor. Accordingly, the display driving circuit 400 may control the overall function of the display device 10. For example, the display driving circuit 400 may align image data from the outside and may supply the aligned image data to the data driving integrated circuits of the data driving circuit 200, and may control a driving timing of the data driving circuit 200. For example, the display driving circuit 400 may control a gate scan signal output timing of the first scan driving circuit 210 and a sensing control signal output timing of the second scan driving circuit 211. For example, the display driving circuit 400 may generate data control signals to control a data voltage output timing of the data driving integrated circuits included in the data driving circuit 200.

Referring to FIG. 2, the display panel 100 may be divided into a main area MA and a sub-area SBA. The main area MA may include a display area DA having the pixels SP displaying an image, and a non-display area NDA disposed around the display area DA. In the display area DA, light may be emitted from light emitting areas or opening areas of each pixel SP to display an image. For example, the pixels SP of the display area DA may include a pixel circuit including switching elements, a pixel defining layer defining the light emitting area or the opening area, and a self-light emitting element.

The non-display area NDA may be any outer area of the display area DA or an area outside the display area DA. The non-display area NDA may be defined as an edge area of the main area MA of the display panel 100. In the non-display area NDA, fan-out lines connecting the first and second scan driving circuits 210 and 211, the data driving circuit 200, and the display driving circuit 400 to the display area DA may be formed.

The first and second scan driving circuits 210 and 211 may be separately formed on a side and another side of the display area DA, respectively. Unlike this, the first and second scan driving circuits 210 and 211 may be formed to be adjacent to each other on a side of the display area DA, and may be formed to be parallel and adjacent to each other on the other side of the display area DA.

The sub-area SBA may extend from a side of the main area MA. The sub-area SBA may be formed of a film of a flexible material that may be bent, folded, rolled, or the like. For example, in case that the sub-area SBA is bent, the sub-area SBA may overlap the main area MA in a thickness direction (e.g., Z-axis direction). The sub-area SBA may include the data driving circuit 200 and a pad portion connected to the circuit board 300. In another example, the sub-area SBA may be omitted, and the data driving circuit 200 and the pad portion may also be disposed in the non-display area NDA.

The data driving circuit 200 may be formed as integrated circuit (IC) and mounted on the display panel 100 by a chip on glass (COG) method, a chip on plastic (COP) method, or an ultrasonic bonding method. For example, the data driving circuit 200 may be disposed in a sub-area SBA, and may overlap the main area MA in the thickness direction (e.g., Z-axis direction) by bending of the sub-area SBA. As another example, the data driving circuit 200 may also be mounted on the circuit board 300.

The circuit board 300 may be electrically connected to the pad portion of the display panel 100 by an anisotropic conductive film (ACF). For example, lead lines of the circuit board 300 may be electrically connected to the pad portion of the display panel 100. The circuit board 300 may be a flexible film such as a flexible printed circuit board, a printed circuit board, or a chip on film.

For example, the display driving circuit 400 may be mounted on the circuit board 300. The display driving circuit 400 may be formed as an integrated circuit (IC).

Figure 3:
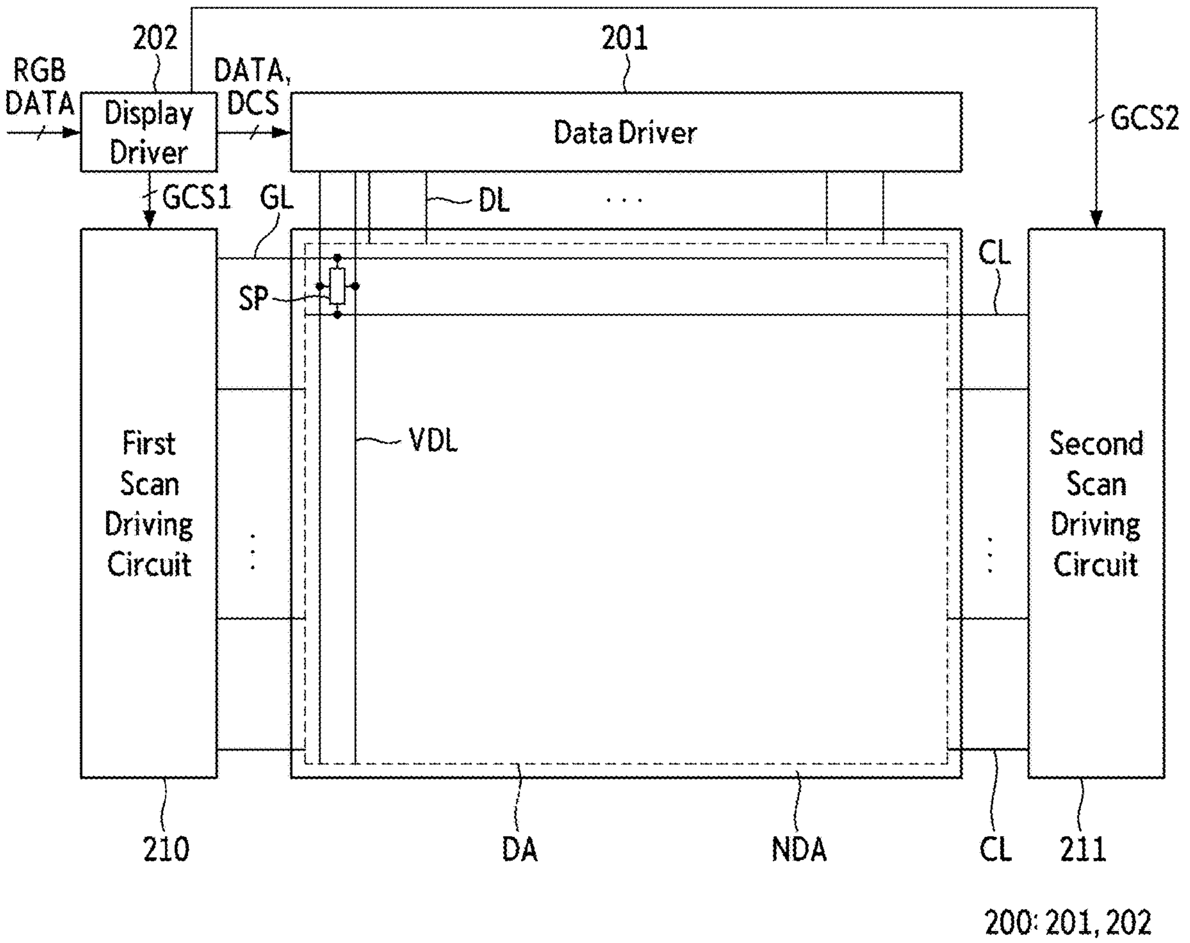
FIG. 3 is a schematic block diagram illustrating an electrical connection relationship between a display panel and each driver illustrated in FIGS. 1 and 2.

FIG. 3 is a schematic block diagram illustrating an electrical connection relationship between a display panel and each driver illustrated in FIGS. 1 and 2.

Referring to FIG. 3, pixels SP may be arranged in a matrix structure in the display area DA. For example, in the display area DA and the non-display area NDA, gate lines GL connected to the pixels SP of each horizontal line for each horizontal line and sensing control lines CL connected to the pixels SP of a horizontal line for each horizontal line may be arranged.

The gate lines GL and the sensing control lines CL may extend in an X-axis direction, which is a first horizontal direction, and may be spaced apart from each other in a first vertical direction intersecting the first horizontal direction. The gate lines GL and the sensing control lines CL may be arranged at regular intervals along the first vertical direction.

The first scan driving circuit 210 may supply a gate scan signal to the pixels SP for each horizontal line through the gate lines GL for each horizontal line based on a first gate control signal GCS1 from the display driving circuit 400. The gate lines GL may sequentially supply the gate scan signals generated sequentially for each horizontal cycle from the first scan driving circuit 210 to the pixels SP for each horizontal line.

The second scan driving circuit 211 may control each pixel SP so that the pixel driving voltage and current of each pixel SP may be output to each voltage detection line for each horizontal line. For example, the second scan driving circuit 211 may sequentially supply sensing control signals to the sensing control lines CL for each horizontal line based on a second gate control signal GCS2 from the display driving circuit 400. The sensing control lines CL may sequentially supply the sensing control signals generated sequentially for each horizontal cycle from the second scan driving circuit 211 to the pixels SP for each horizontal line.

The gate scan signals of the first scan driving circuit 210 and the sensing control signals of the second scan driving circuit 211 may be alternately generated at different timings for each horizontal period. For example, in units of each horizontal period, the gate scan signal may first be supplied to the gate line GL, and in units of the next horizontal period, the sensing control signal may be supplied to the compensation sensing control line CL.

For example, in the display area DA and the non-display area NDA, data lines DL connected pixels SP of each vertical line for each vertical line may be arranged, and may be electrically connected to the data driving circuit 200. The data voltage may determine emission luminance of each of the pixels SP. Furthermore, in the display area DA and the non-display area NDA, voltage detection lines VDL connected pixels SP of each vertical line for each vertical line may be arranged, and may be electrically connected to the data driving circuit 200. The pixels SP of each horizontal line may share the pixel driving voltage to each voltage detection line VDL in response to the compensation sensing control signal input in units of horizontal periods. Accordingly, the data driving circuit 200 may receive the pixel driving voltage and current of each pixel SP in units of horizontal lines through each voltage detection line VDL.

For example, the data driving integrated circuits of the data driving circuit 200 may receive and sense pixel driving voltages and currents for pixels SP in units of horizontal lines for each horizontal cycle through each voltage detection line VDL. As an example, the data driving integrated circuits may sequentially sense the pixel driving voltages and currents received from each pixel SP in units of horizontal lines for each horizontal period.

The data driving integrated circuits may generate voltage sensing data or current sensing data by performing analog-to-digital modulation processing according to the magnitude of the sensed pixel driving voltage and current amount of each pixel SP. The data driving integrated circuits may transmit the voltage and current sensing data to the display driving circuit 400 in units of at least one horizontal line.

The display driving circuit 400 may receive digital image data (RGB DATA) and timing synchronization signals from the outside. The display driving circuit 400 may align the image data (RGB DATA) input from the outside in units of at least one frame according to a resolution of the display area DA. For example, the display driving circuit 400 may sequentially supply the aligned image data by at least one horizontal line to the data driving integrated circuits of the data driving circuit 200. For example, the display driving circuit 400 may generate a data driving control signal DCS based on the timing synchronization signals to control an operation timing of the data driving circuit 200. For example, the display driving circuit 400 may generate first and second gate control signals GCS1 and GCS2 to control the operation timing of each of the first and second scan driving circuits 210 and 211.

The data driving integrated circuits of the data driving circuit 200 may supply data voltages according to the image data DATA to the data lines DL of the display unit DU based on the data driving control signal DCS. For example, the data driving integrated circuits may supply the data voltages to the data lines DL connected to each pixel SP in units of horizontal lines for each horizontal cycle.

Figure 4:
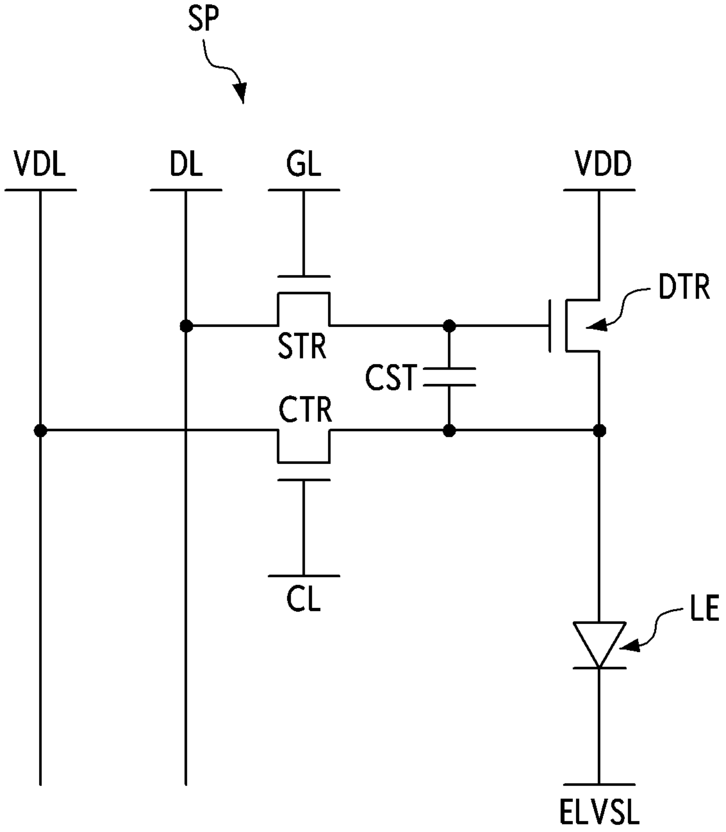
FIG. 4 is a schematic diagram of an equivalent circuit of an example of a pixel of the display panel illustrated in FIG. 3.

FIG. 4 is a schematic diagram of an equivalent circuit of an example of a pixel of the display panel illustrated in FIG. 3.

Referring to FIG. 4, each pixel SP may include two transistors STR and DTR for emitting light from the light emitting element LE, one storage capacitor CST, and a control transistor CTR for transmitting the pixel driving voltage supplied to the light emitting element LE to the voltage detection line VDL.

The driving transistor DTR may adjust the amount of current flowing from a first power line VDD to which a first power voltage is supplied to the light emitting element LE according to a voltage difference between a gate electrode and a source electrode of the driving transistor DTR. The gate electrode of the driving transistor DTR may be connected to a first electrode of a first transistor T1, a first electrode of the driving transistor DTR may be connected to the first power line VDD to which the first power voltage is applied, and a second electrode of the driving transistor DTR may be connected a first electrode of the light emitting element LE. For example, the light emitting element LE may be connected between the second electrode of the driving transistor DTR and a second power line ELVSL.

The switching transistor STR may be turned on by the gate scan signal of the gate line GL and may supply the data voltage of the data line DL to the gate electrode of the driving transistor DTR. A gate electrode of the switching transistor STR may be connected to one gate line GL, a first electrode of the switching transistor STR may be connected to the data line DL, and a second electrode of the switching transistor STR may be connected to the gate electrode of the driving transistor DTR.

The storage capacitor CST may be formed between the gate electrode and the second electrode of the driving transistor DTR. The storage capacitor CST may store a difference voltage between a gate voltage and a source voltage or a drain voltage of the driving transistor DTR.

The scan control transistor CTR may be turned on by the sensing control signal of the sensing control line CL and may electrically connect the first electrode of the light emitting element LE and one of the voltage detection lines VDL. The pixel driving voltage may be supplied to the data driving circuit 200 through the voltage detection line VDL.

The switching transistor STR, the driving transistor DTR, and the scan control transistor CTR may be formed as thin film transistors. For example, it is described in FIG. 4 that the switching transistor STR, the driving transistor DTR, and the scan control transistor CTR are N-type metal oxide semiconductor field effect transistors (MOSFETs), but embodiments are not limited thereto. For example, the switching transistor STR, the driving transistor DTR, and the scan control transistor CTR may be formed as P-type MOSFETs, or some may be formed as N-type MOSFETs and others as P-type MOSFETs.

Figure 5:
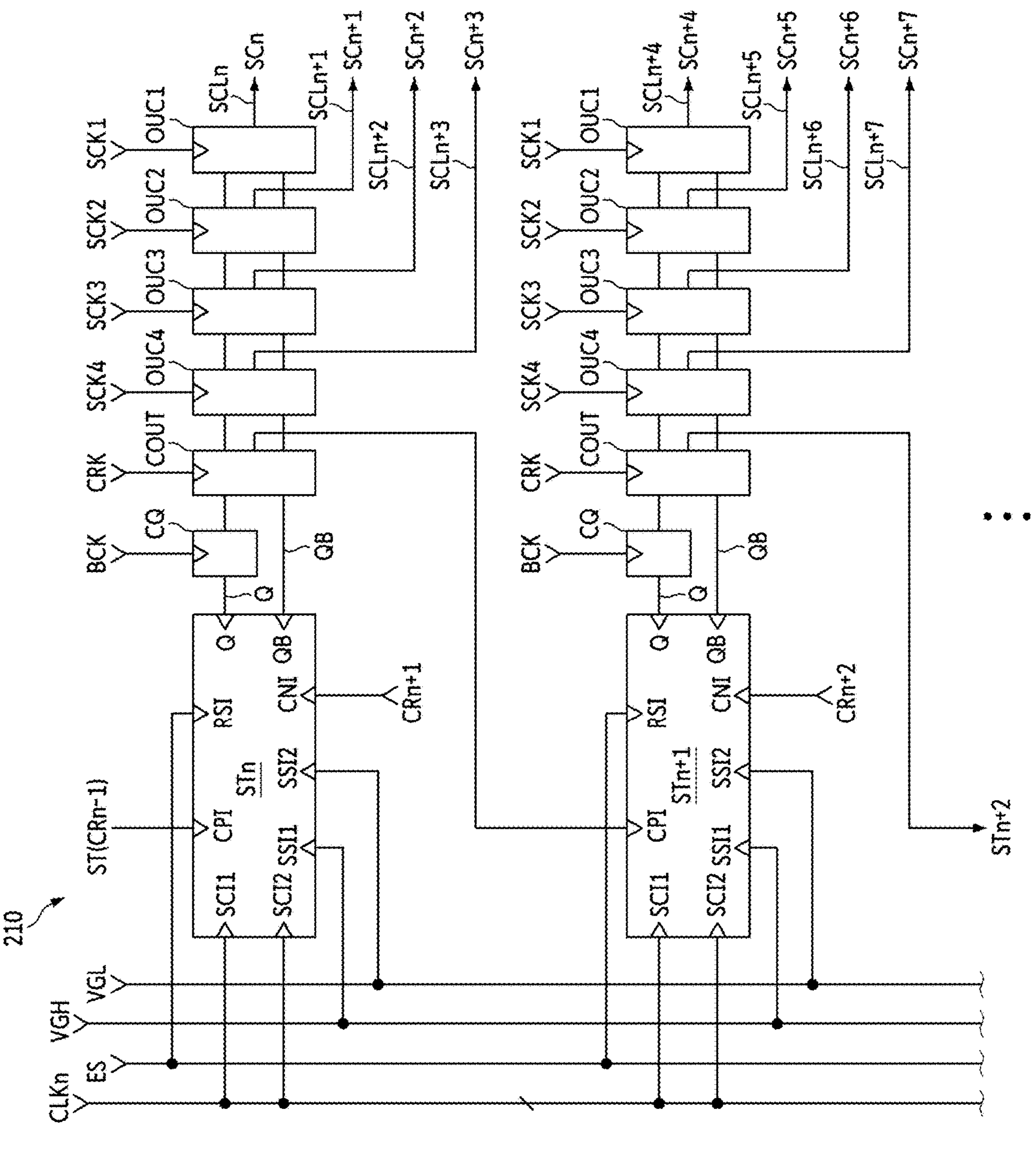
FIG. 5 is a schematic block diagram illustrating a scan driver according to an embodiment.

FIG. 5 is a schematic block diagram illustrating a scan driver according to an embodiment.

Referring to FIG. 5, the first scan driving circuit 210 according to an embodiment may include stages that are cascadedly connected to each other, e.g., an n-th stage STn, output control units (or output control parts) OUC1 to OUC4, carry output units (or carry output parts) COUT, and node voltage control units (or node voltage control parts) CQ. Here, n may be a positive integer.

For convenience of explanation, in FIG. 5, only an n+1-th stage STn+1 is illustrated based on the n-th stage STn. The n-th stages STn may be cascadedly connected to each other. Here, n may be a natural number of 2 or more, and in the case where n-th stages STn are formed, the n-th stages STn may be cascadedly connected to each other.

In the following description, "previous stage" refers to a stage located before the n-th stage STn, which is a reference stage. The "subsequent stage" refers to an n+1-th stage STn+1 located behind the n-th stage (STn), which is the reference stage.

Scan clock lines, to which are respectively applied scan clock signals (CLKn) whose phases are sequentially delayed or sequentially alternated, and sensing control lines, to which are respectively applied a start signal, a stage select signal ES, and a reset signal, may be respectively disposed on a side of all stages, including the n-th stage STn and the n+1-th stage STn+1.

The scan clock signals CLKn, the stage select signal ES, the start signal ST, the reset signal, line select signals SCK1 to SCK4, a carry select signal CRK, and a pull-up control signal BCK may be the first gate control signal GCS1 generated from the display driving circuit 400 and transmitted through the first gate control line GSL1.

In FIG. 5, the first gate control lines GSL1 may be implemented as multi-channel line type scan clock lines, eight line select signal SCK1 to SCK4 a transmission line, two carry select signal CRK transmission lines, two pull-up control signal BCK transmission lines, and two power lines, but the number of these lines is not limited to the drawing of FIG. 5 and may be formed in a greater number.

Each of the stages, including the n-th stage STn and the n+1-th stage STn+1 may include a front-end carry terminal CPI, a rear-end carry terminal CNI, a first scan clock terminal SCI1, a second scan clock terminal SCI2, a first power supply terminal SSI1, a second power supply terminal SSI2, a sensing signal terminal RSI, and a scan output terminal SCO.

In case that the n-th stage STn is a first stage, the start signal ST may be separately input to the carry terminal CPI in the front-end carry terminal CPI of the n-th stage STn through the start signal line. In case that the n-th stage STn is cascadedly connected to any of the previous stages, a carry signal CRn−1 of the previous stage may be input to the front-end carry terminal CPI.

The front-end carry terminal CPI of each stage connected in a cascaded manner after the first stage may receive each carry signal from the carry output unit COUT of the stage located immediately at the front end. For example, as illustrated in FIG. 5, the front-end carry terminal CPI of the n+1-th stage STn+1 may receive an n-th carry signal from the carry output unit COUT of the n-th stage STn.

The rear-end carry terminal CNI of each of all stages, including the n-th stage STn and the n+1-th stage STn+1, may receive each carry signal from the carry output unit COUT of one of the rear-end stages. For example, the rear-end carry terminal CNI of the n-th stage STn may receive the n+1-th carry signal CRn+1 from the carry output unit COUT of the n+1-th stage STn+1. For example, the rear-end carry terminal CNI of the n+1-th stage STn+1 may receive an n+2-th carry signal CRn+2 from the carry output unit COUT of the n+2-th stage STn+2.

The output control units OUC1 to OUC4 may share a pull-up node Q of each n-th stage STn and may be connected in series or in parallel to the pull-up node Q of each n-th stage STn.

The output control units OUC1 to OUC4 that share the pull-up node Q of each n-th stage STn may sequentially output gate scan signals SCn in response to the line select signals SCK1 to SCK4 sequentially input from the display driving circuit 400.

For example, the first to fourth output control units OUC1 to OUC4 that share the pull-up node Q of the n-th stage STn may sequentially output n-th to n+3-th gate scan signals SCn to SCn+3 to the n-th to n+3-th gate lines in response to first to fourth line select signals SCK1 to SCK4 sequentially input during an enable period (or charging period) of the pull-up node Q.

As an example, the first output control unit OUC1 of the first to fourth output control units OUC1 to OUC4 that share the pull-up node Q of the n-th stage STn may output the n-th gate scan signal SCn to the first gate line in response to the first line select signal SCK1 input during the enable period (or charging period) of the pull-up node Q.

Next, the second output control unit OUC2 may output the n+1-th gate scan signal SCn+1 to the second gate line through the n+1-th scan signal line SCLn+1 in response to the second line select signal SCK2 input during the enable period of the pull-up node Q.

For example, the third output control unit OUC3 may output the n+2-th gate scan signal SCn+2 to the third gate line through the n+2-th scan signal line SCLn+2 in response to the third line select signal SCK3 input during the enable period of the pull-up node Q.

The fourth output control unit OUC4 may output the n+3-th gate scan signal SCn+3 to the fourth gate line through the n+3-th scan signal line SCLn+3 in response to the fourth line select signal SCK4 input during the enable period of the pull-up node Q.

For example, the first output control unit OUC1 of the first to fourth output control units OUC1 to OUC4 that share the pull-up node Q of the n+1-th stage STn+1 may output the n+4-th gate scan signal SCn+4 to the fifth gate line through the n+4-th scan signal line SCLn+4 in response to the first line select signal SCK1 input during the enable period (or charging period) of the pull-up node Q.

Next, the second output control unit OUC2 of the n+1-th stage STn+1 may output the n+5-th gate scan signal SCn+5 to the sixth gate line through the n+5-th scan signal line SCLn+5 in response to the second line select signal SCK2 input during the enable period of the pull-up node Q.

For example, the third output control unit OUC3 of the n+1-th stage STn+1 may output the n+6-th gate scan signal SCn+6 to the seventh gate line through the n+6-th scan signal line SCLn+6 in response to the third line select signal SCK3 input during the enable period of the pull-up node Q.

The fourth output control unit OUC4 of the n+1-th stage STn+1 may output the n+7-th gate scan signal SCn+7 to the eighth gate line through the n+7-th scan signal line SCLn+7 in response to the fourth line select signal SCK4 input during the enable period of the pull-up node Q.

The carry output units COUT may share the pull-up node Q of each of the n-th stages STn and may output at least one carry signal to the previous and next stages.

For example, each of the carry output units COUT may share the pull-up node Q of each of the n-th stages STn and may be connected in series or in parallel to the first to fourth output control units OUC1 to OUC4.

Each carry output unit COUT may output at least one carry signal CRn to front-end and rear-end stages of each carry output unit COUT in response to the carry select signal CRK selectively input from the display driving circuit 400 during the enable period of the pull-up node Q.

The node voltage control units CQ may control the charge voltage magnitude QV of the pull-up node Q for each n-th stage STn in response to a pull-up control signal BCK from the display driving circuit 400.

For example, each of the node voltage control units CQ may share the pull-up node Q of each of the n-th stages STn and may be connected in series or in parallel to the first to fourth output control units OUC1 to OUC4 and the carry output unit COUT.

Each node voltage control unit CQ may adjust the voltage magnitude of the QV according to the change in the voltage magnitude of the pull-up control signal BCK input from the display driving circuit 400 during the enable period of the pull-up node Q.

Figure 6:
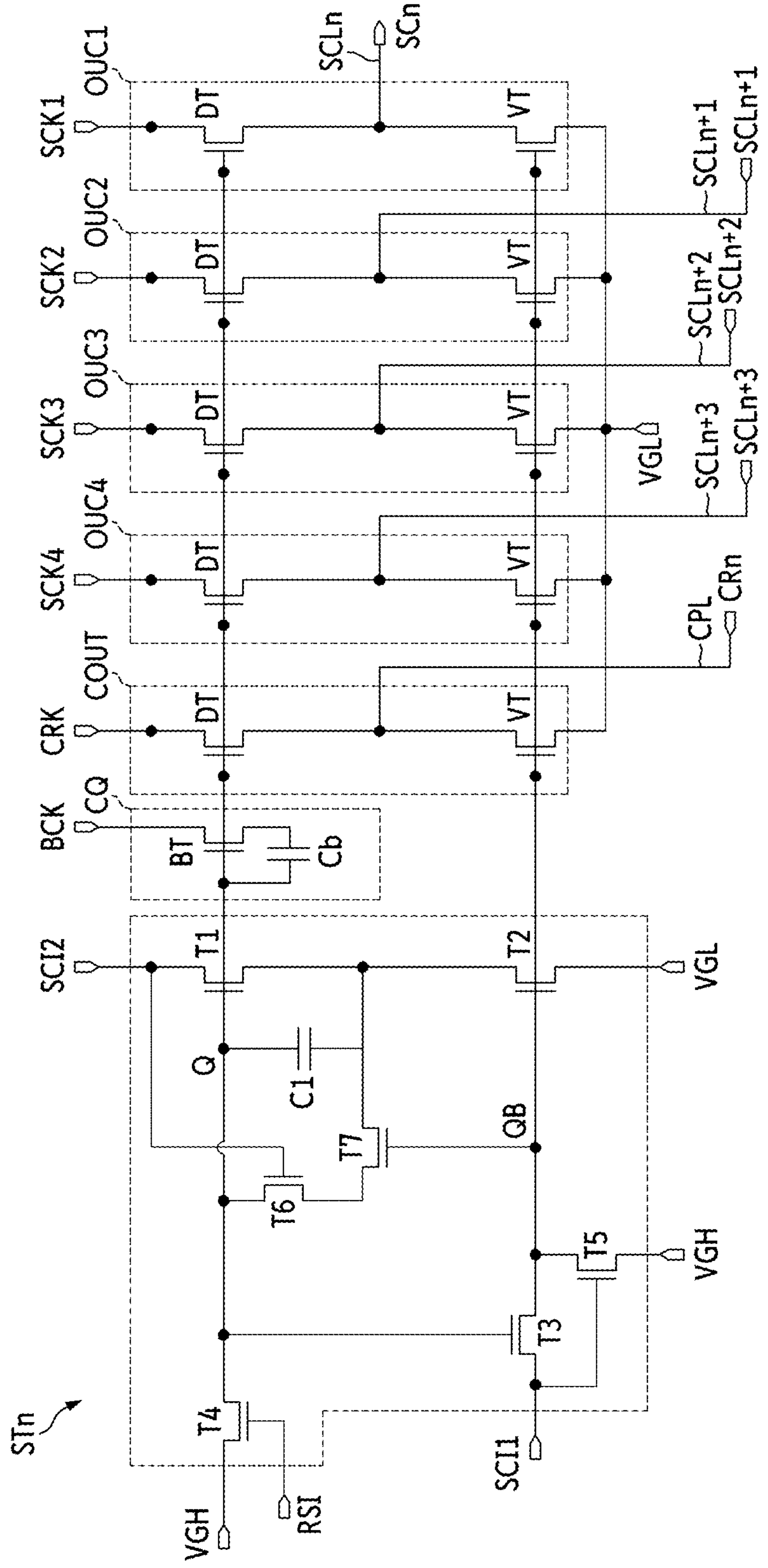
FIG. 6 is a schematic diagram of an equivalent circuit of an n-th stage and output circuits illustrated in FIG. 5.

FIG. 6 is a schematic diagram of an equivalent circuit of an n-th stage and output circuits illustrated in FIG. 5.

Referring to FIG. 6, the n-th stage STn may include a first power supply terminal SSI1 supplied with a gate-on voltage VGH, and a second power supply terminal SSI2 supplied with a gate-off voltage VGL.

The n-th stage STn may operate by receiving the start signal ST through the front-end carry terminal CPI, and may operate by receiving the gate scan signal of the previous stage as the carry signal to the front-end carry terminal CPI in case that it is cascadedly connected to the previous stage. For example, the n-th stage STn may also operate sequentially in response to the stage select signal ES input during a preset (or selected) active period.

The n-th stage STn may supply a voltage of the gate-on voltage VGH to the pull-up node Q during the active period of each frame period and may control the pull-up node Q as well as the output control units OUC1 to OUC4 and the carry output units COUT to be enabled. For example, the active period of each n-th stage STn may be preset according to the number of output control units OUC1 to OUC4 that share the pull-up node Q of each n-th stage STn. As an example, in case that the first to fourth output control units OUC1 to OUC4 are connected to the pull-up node Q of each n-th stage STn, the active period of each n-th stage STn may be at least 4 horizontal periods. For example, while the pull-up node Q of each n-th stage STn is charged and maintained to the gate-on voltage VGH, the gate-off voltage VGL of the second power supply terminal SSI2 may be applied to a pull-down node QB.

For example, the n-th stage STn may operate according to the stage select signal ES or the carry signal (or start signal ST) of the front-end stage, and may supply the gate-on voltage VGH to the pull-up node Q by being switched by clock signals. For example, the stage select signal ES or the carry signal of the front-end stage may have the magnitude of the gate-on voltage. The pull-up node Q of the n-th stage STn may be enabled according to the magnitude of the gate-on voltage VGH in case that the gate-on voltage VGH is applied. The n-th stage STn ensures that the gate-off voltage VGL is applied to the pull-down node QB during the period in which the gate-on voltage VGH is supplied to the pull-up node Q.

The first to fourth output control units OUC1 to OUC4 that share the pull-up node Q of the n-th stage STn may sequentially output n-th to n+3-th scan signals SCn to SCn+3 to the n-th to n+3-th gate lines in response to the first to fourth line select signals SCK1 to SCK4 sequentially input during an enable period (or charging period) of the pull-up node Q.

For example, the carry output unit COUT may output at least one carry signal CRn to front-end and rear-end stages of the carry output unit COUT in response to the carry select signal CRK selectively input from the display driving circuit 400 during the enable period of the pull-up node Q.

The node voltage control unit CQ may adjust the voltage magnitude QV of the pull-up node Q according to the change in the voltage magnitude of the pull-up control signal BCK input from the display driving circuit 400 during the enable period.

After the n-th to n+3-th scan signals SCn to SCn+3 are output during the enable period of the pull-up node Q, the n-th stage STn may supply the gate-off voltage VGL to the pull-up node Q in response to any one of the carry signal and clock signals CLKn of the front end. Accordingly, the pull-up node Q may be disabled by the gate-off voltage VGL. For example, the n-th stage STn may enable the pull-down node QB to the gate-on voltage VGH in response to any one scan clock signal among the clock signals CLKn during a period in which the pull-up node Q is disabled.

In case that the pull-down node QB of the n-th stage STn is enabled, the first to fourth output control units OUC1 to OUC4 may electrically connect the n-th to n+3-th scan signal lines SCLn to SCLn+3 to the second power supply terminal SSI2 to which the gate-off voltage VGL is applied.

Referring to FIG. 6, the n-th stage STn may include first to seventh transistors T1 to T7 and at least one first capacitor C1, and one of a first electrode and a second electrode of each of the first to seventh transistors T1 to T7 may be a source electrode and the other thereof may be a drain electrode.

A gate electrode of the first transistor T1 may be connected to the pull-up node Q, the first electrode of the first transistor T1 may be connected to the second scan clock terminal SCI2, and the second electrode of the first transistor T1 may be connected to the front-end carry terminal CPI and the first electrode of the second transistor T2. In case that the pull-up node Q is enabled by the gate-on voltage VGH, the first transistor T1 may be turned on and supply the clock signals CLKn that are sequentially supplied to the first capacitor C1 and the second transistor T2 that are connected in parallel.

A gate electrode of the second transistor T2 may be connected to the pull-down node QB, and the first electrode of the second transistor T2 may be connected to the second electrode of the first transistor T1 and the front-end carry terminal CPI. For example, the second electrode of the second transistor T2 may be connected to the second power supply terminal SSI2. In case that the pull-down node QB is enabled by the gate-on voltage VGH, the second transistor T2 may be turned on and may supply the gate-off voltage VGL to the first transistor T1.

A gate electrode of the third transistor T3 may be connected to the pull-up node Q, and the first electrode of the third transistor T3 may be connected to the first scan clock terminal SCI1. For example, the second electrode of the third transistor T3 may be connected to the pull-down node QB. In case that the pull-up node Q is enabled by the gate-on voltage VGH, the third transistor T3 may be turned on and may supply the clock signals CLKn to the pull-down node QB.

A gate electrode of the fourth transistor T4 may be connected to the sensing signal terminal RSI or the front-end carry terminal CPI, and the first electrode of the fourth transistor T4 may be connected to the first power supply terminal SSI1. For example, the second electrode of the fourth transistor T4 may be connected to the pull-up node Q. The fourth transistor T4 may be turned on in response to the stage select signal ES or the front-end carry signal of the sensing signal terminal RSI and may supply the gate-on voltage VGH to the pull-up node Q. Accordingly, the fourth transistor T4 may enable the pull-up node Q to the magnitude of the gate-on voltage VGH during the active period in response to the stage select signal ES or the front-end carry signal of the sensing signal terminal RSI.

A gate electrode of the sixth transistor T6 may be connected to the second scan clock terminal SCI2, and the first electrode of the sixth transistor T6 may be connected to the pull-up node Q. For example, the second electrode of the sixth transistor T6 may be connected to the second electrode of the first transistor T1 or the first electrode of the seventh transistor T7. The sixth transistor T6 may electrically connect the pull-up node Q to the second electrode of the first transistor T1 or the first electrode of the seventh transistor T7 in response to at least one clock signal CLKn. The sixth transistor T6 may serve (or function) as a diode between the pull-up node Q and the first capacitor C1.

A gate electrode of the seventh transistor T7 may be connected to the pull-down node QB, and the first electrode of the seventh transistor T7 may be connected to the second electrode of the sixth transistor T6. For example, the second electrode of the seventh transistor T7 may be connected to the second electrode of the first transistor T1 and the first capacitor C1. In case that the pull-down node QB is enabled, the seventh transistor T7 may be turned on and may electrically connect the second electrode of the sixth transistor T6 to the first capacitor C1 and the second electrode of the first transistor T1. The seventh transistor T7 may serve (or function) as a diode to keep the sixth transistor T6 and the first transistor T1 turned off during the enable period of the pull-down node QB.

Each of the first to fourth output control units OUC1 to OUC4 may include a pull-up transistor DT and a pull-down transistor VT.

A first electrode of the pull-up transistor DT may be connected to each line select signal input terminal that receives one of the first to fourth line select signals SCK1 to SCK4, and a gate electrode of the pull-up transistor DT may be connected to the pull-up node Q. For example, a second electrode of the pull-up transistor DT may be connected to a scan signal line connection terminal of one of the n-th to n+3-th scan signal lines SCLn to SCLn+3.

For example, the pull-up transistor DT of the first output control unit OUC1 may be turned on by the gate-on voltage VGH of the pull-up node Q and may output a first line select signal SCK1 input to each first line select signal input terminal to an n-th scan signal line SCLn. As a result, an n-th scan signal SCn of the gate-on voltage may be supplied to the n-th scan signal line SCLn.

A first electrode of each pull-down transistor VT of the first to fourth output control units OUC1 to OUC4 may be connected to a scan signal line connection terminal of one of the n-th to n+3-th scan signal lines SCLn to SCLn+3, and a gate electrode of each pull-down transistor VT may be connected to the pull-down node QB. For example, a second electrode of each pull-down transistor VT may be connected to the second power supply terminal SSI2.

The pull-down transistor VT may be turned on by the gate-on voltage VGH of the pull-down node QB and applies the gate-off voltage VGL input to the second power supply terminal SSI2 to one of the scan signal lines SCLn to SCLn+3 each connected thereto. As a result, each of the scan signal lines SCLn to SCLn+3 may be maintained at the gate-off voltage VGL during the turn-on period of the pull-down transistor VT.

The carry output unit COUT may also include a pull-up transistor DT and a pull-down transistor VT.

The pull-up transistor DT of the carry output unit COUT may be turned on by the gate-on voltage VGH of the pull-up node Q and may output the carry select signal CRK input to the carry select signal input terminal to the front-end and rear-end stages of the previous and next stages.

The pull-down transistor VT of the carry output unit COUT may be turned on by the gate-on voltage VGH of the pull-down node QB and may output the gate-off voltage VGL input to the second power supply terminal SSI2 to the front-end and rear-end stages of the carry output unit COUT.

Each node voltage control unit CQ may include a pull-up control transistor BT and a pull-up capacitor Cb.

The pull-up control transistor BT may be turned on by the gate-on voltage VGH of the pull-up node Q and may output a pull-up control signal BCK input to a first electrode to a second electrode.

A first electrode of the pull-up capacitor Cb may be connected to the pull-up node Q in a parallel structure with the pull-up control transistor BT, and a second electrode of the pull-up capacitor Cb may be connected to the second electrode of the pull-up control transistor BT.

In case that the pull-up control transistor BT of the node voltage control unit CQ may be turned on by the gate-on voltage VGH of the pull-up node Q, the pull-up control transistor BT of the node voltage control unit CQ may supply the pull-up control signal BCK from the display driving circuit 400 to the second electrode of the pull-up capacitor Cb.

The pull-up capacitor Cb may vary or maintain the voltage magnitude QV of the pull-up node Q connected to the first electrode according to the voltage magnitude of the pull-up control signal BCK input to the second electrode.

Accordingly, each node voltage control unit CQ may adjust the voltage magnitude QV of the pull-up node Q according to the change in the voltage magnitude of the pull-up control signal BCK input from the display driving circuit 400 during the enable period of the pull-up node Q.

Figure 7:
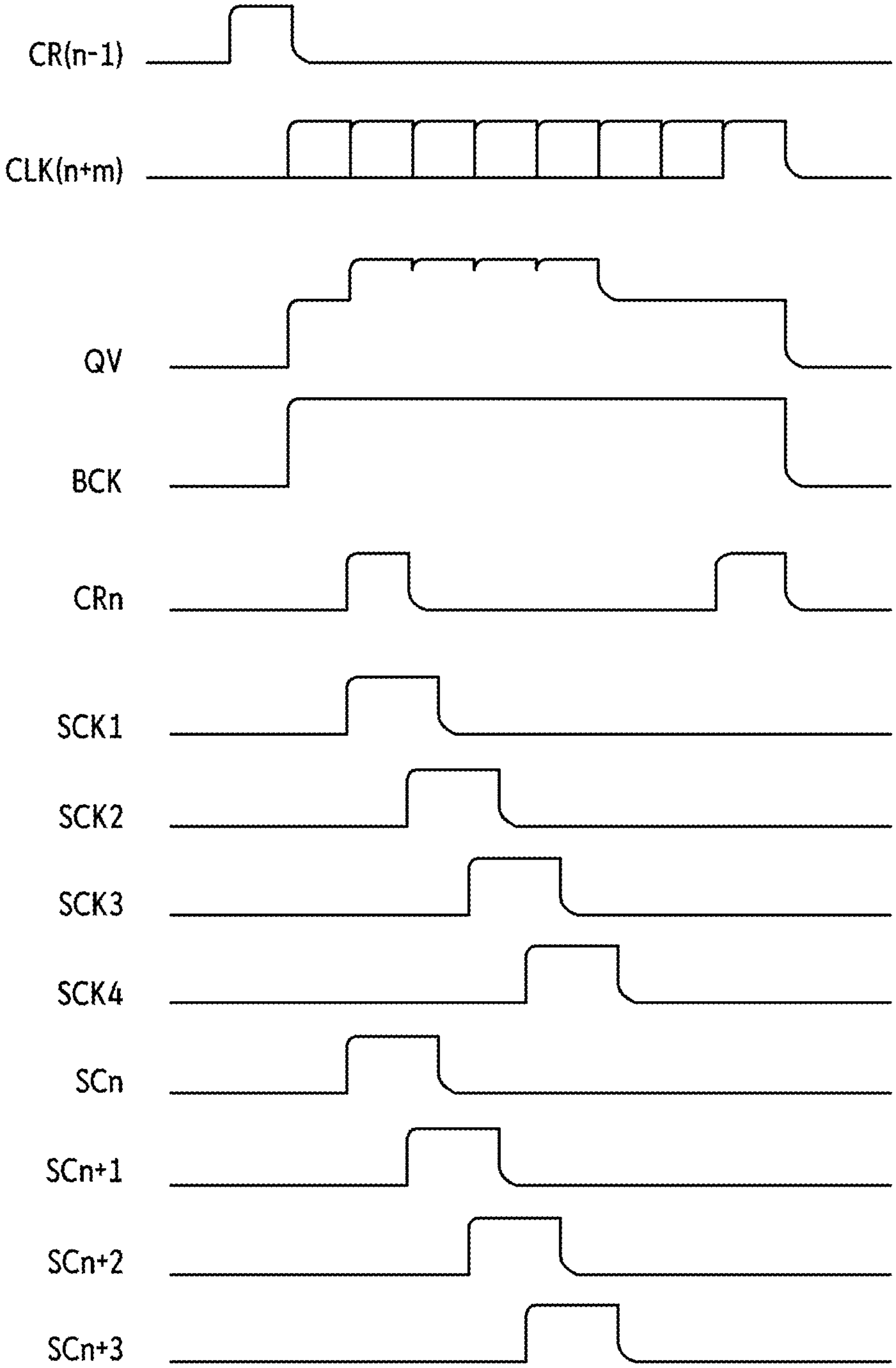
FIG. 7 is a waveform diagram illustrating signals input and output to the n-th stage and the output circuits and a voltage level of a pull-up node according to a first embodiment.

FIG. 7 is a waveform diagram illustrating signals input and output to the n-th stage and the output circuits and a voltage magnitude of a pull-up node according to a first embodiment.

Referring to FIG. 7, the start signal ST, the stage select signal ES, the carry select signal CRK, the clock signals CLK(n+m), etc. may be signals that are generated at the magnitude of the gate-on voltage VGH for at least one horizontal period.

The display driving circuit 400 may generate the start signal ST, the stage select signal ES, the carry select signal CRK, the clock signals CLK(n+m), the first to fourth line select signals SCK1 to SCK4, and the pull-up control signal BCK using a separate pulse signal generator, etc.

The display driving circuit 400 may supply the start signal ST, the stage select signal ES, and the clock signals CLK(n+m) to each of the n-th and n+1-th stages STn and STn+1, and may supply the carry select signal CRK to the carry output unit COUT. For example, the display driving circuit 400 may sequentially supply the first to fourth line select signals SCK1 to SCK4 to the first to fourth output control units OUC1 to OUC4, respectively, and may sequentially supply the pull-up control signal BCK to the node voltage control unit CQ.

A stage select signal ES may be generated for one horizontal period so that the gate-on voltage VGH may be supplied to the pull-up node Q of each of the stages STn and STn+1 during the active period. The stage select signal ES may be replaced by a carry signal from the previous stage (e.g., the rear-end carry signal CR(n−1)) although it is not separately generated and supplied.

For example, the gate-on voltage VGH may be a gate high voltage capable of turning on the transistors of the n-th stage STn, the first to fourth output control units OUC1 to OUC4, and the carry output units COUT, and the transistors of the pixels SP. The gate-off voltage VGL may be a gate low voltage capable of turning off the transistors of the n-th stage STn, the first to fourth output control units OUC1 to OUC4, and the carry output units COUT, and the transistors of the pixels SP.

The clock signals CLK(n+m) (where m is a natural number greater than n) may be clock signals that are sequentially phase delayed or repeatedly generated. Each of the clock signals CLK(n+m) may be repeatedly generated with the magnitude of the gate-on voltage VGH for at least one horizontal period. For example, the generation period, pulse width, and amplitude for each of the clock signals CLK(n+m) are not limited to FIG. 7 and may be changed in various ways.

The first to fourth line select signals SCK1 to SCK4 may be clock signals that are sequentially phase delayed and repeatedly generated. The display driving circuit 400 sequentially may generate the first to fourth line select signals SCK1 to SCK4 with the magnitude of the gate-on voltage VGH for at least one horizontal period, and may sequentially supply the first to fourth line select signals SCK1 to SCK4 to each of the first to fourth output control units OUC1 to OUC4.

The display driving circuit 400 may generate a pull-up control signal BCK corresponding to the period in which the pull-up node Q of each stage STn is enabled and sequentially supplies the pull-up control signal BCK to the node voltage control unit CQ during the period in which the pull-up node Q of each stage STn is enabled.

The display driving circuit 400 may generate a pull-up control signal BCK with a voltage magnitude substantially equal to the magnitude of the gate-on voltage VGH and may sequentially supply the pull-up control signal BCK to the node voltage control unit CQ during the period in which the pull-up node Q of each stage STn is enabled.

Referring to FIGS. 6 and 7, an operation of the n-th stage STn during one frame period is briefly described as follows.

First, the fourth transistor T4 may be turned on in response to the stage select signal ES or the start signal ST of the sensing signal terminal RSI and may supply the gate-on voltage VGH to the pull-up node Q. Accordingly, the pull-up node Q may be enabled.

In case that the pull-up node Q is enabled by the gate-on voltage VGH, the first transistor T1 may be turned on and charges the first capacitor C1. As a result, the pull-up node Q may be bootstrapped.

The display driving circuit 400 may generate a pull-up control signal BCK with a voltage magnitude substantially equal to the magnitude of the gate-on voltage VGH during the period in case that the pull-up node Q of the n-th stage STn is enabled and may supply the pull-up control signal BCK to the node voltage control unit CQ.

The pull-up control transistor BT of the node voltage control unit CQ may be turned on by the gate-on voltage VGH of the pull-up node Q, and may supply the pull-up control signal BCK from the display driving circuit 400 to the second electrode of the pull-up capacitor Cb. Accordingly, the pull-up capacitor Cb may vary or maintain the voltage magnitude QV of the pull-up node Q connected to the first electrode according to the voltage magnitude of the pull-up control signal BCK input to the second electrode.

The first to fourth output control units OUC1 to OUC4 may sequentially output n-th to n+3-th scan signals SCn to SCn+3 to the n-th to n+3-th gate lines in response to the first to fourth line select signals SCK1 to SCK4 sequentially input during an enable period (or charging period) of the pull-up node Q.

For example, the carry output unit COUT may outputs at least one carry signal CRn to front-end and rear-end stages of the carry output unit COUT in response to the carry select signal CRK selectively input from the display driving circuit 400 during the enable period of the pull-up node Q.

For example, the node voltage control unit CQ may maintain or adjust the voltage magnitude QV of the pull-up node Q according to the change in the voltage magnitude of the pull-up control signal BCK input from the display driving circuit 400 during the enable period of the pull-up node Q.

Figure 8:
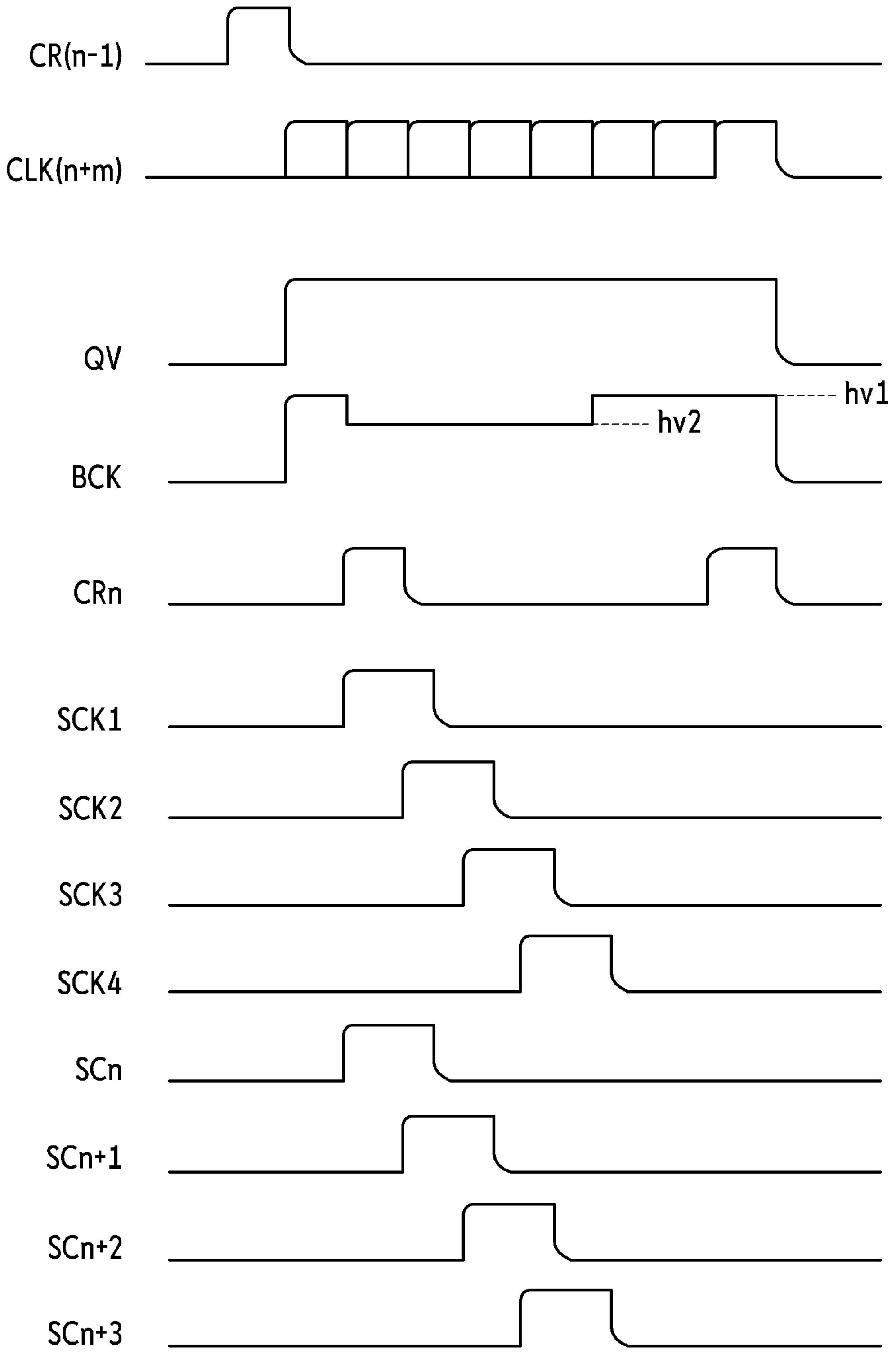
FIG. 8 is a waveform diagram illustrating signals input and output to the n-th stage and the output circuits and a voltage level of a pull-up node according to a second embodiment.

FIG. 8 is a waveform diagram illustrating signals input and output to the n-th stage and the output circuits and a voltage level of a pull-up node according to a second embodiment.

Referring to FIG. 8, the display driving circuit 400 may generate a pull-up control signal BCK corresponding to the period in which the pull-up node Q of each stage STn is enabled and sequentially supplies the pull-up control signal BCK to the node voltage control unit CQ during the period in which the pull-up node Q of each stage STn is enabled.

For example, the display driving circuit 400 may vary the pull-up control signal BCK to a first voltage magnitude hv1 greater than a preset (or selected) magnitude of the gate-on voltage VGH and a second voltage magnitude hv2 substantially equal to the preset (or selected) magnitude of the gate-on voltage VGH during the period in which the pull-up node Q of each stage STn is enabled, and supply the varied pull-up control signals BCK to the node voltage control unit CQ.

Accordingly, the pull-up control transistor BT of the node voltage control unit CQ may be turned on by the gate-on voltage VGH of the pull-up node Q, and may supply the pull-up control signal BCK from the display driving circuit 400 to the second electrode of the pull-up capacitor Cb. Accordingly, the pull-up capacitor Cb may adjust the voltage magnitude QV of the pull-up node Q connected to the first electrode according to the first voltage magnitude hv1 and the second voltage magnitude hv2 of the pull-up control signal BCK input to the second electrode.

The first scan driving circuit 210 and the second scan driving circuit 211 according to an embodiment may be respectively disposed in different non-display areas NDA, but the first scan driving circuit 210 and the second scan driving circuit 211 may be disposed to be adjacent to each other in one non-display area NDA.

The second scan driving circuit 211 may be formed in the same manner as the configuration of the n-th stage STn, the output control units OUC1 to OUC4, the carry output units COUT, and the node voltage control units CQ of the first scan driving circuit 210.

Figure 9:
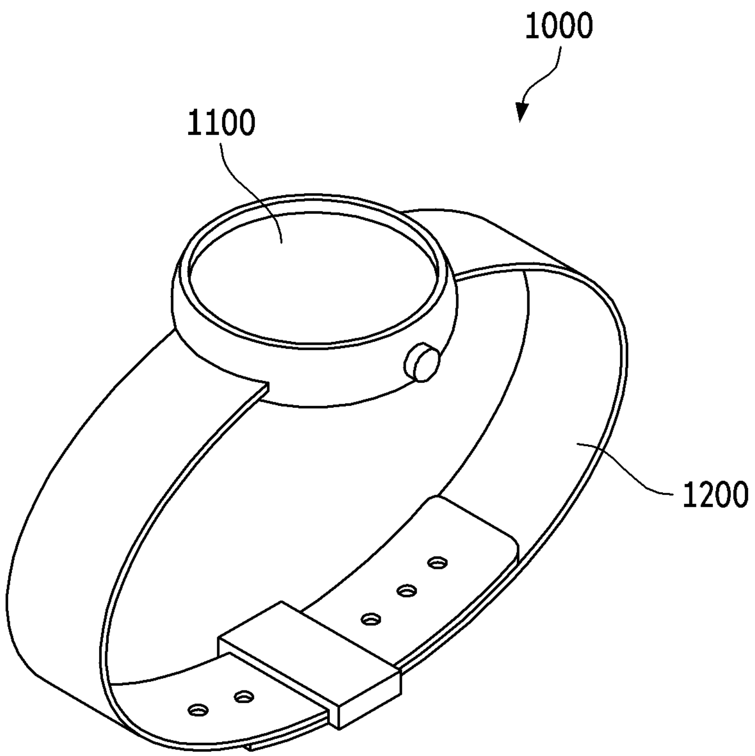
FIGS. 9 and 10 are schematic perspective views illustrating application examples of electronic devices.

Referring to FIG. 9, the electronic device may be applied to a smart watch 1000 including a display part 1100 and a strap part 1200. The smart watch 1000 may be a wearable electronic device. For example, the smart watch 1000 may have a structure in which the strap part 1200 is mounted on a wrist of a user. The electronic device may be applied to the display part 1100, so that image data including time information can be provided to the user.

Figure 10:
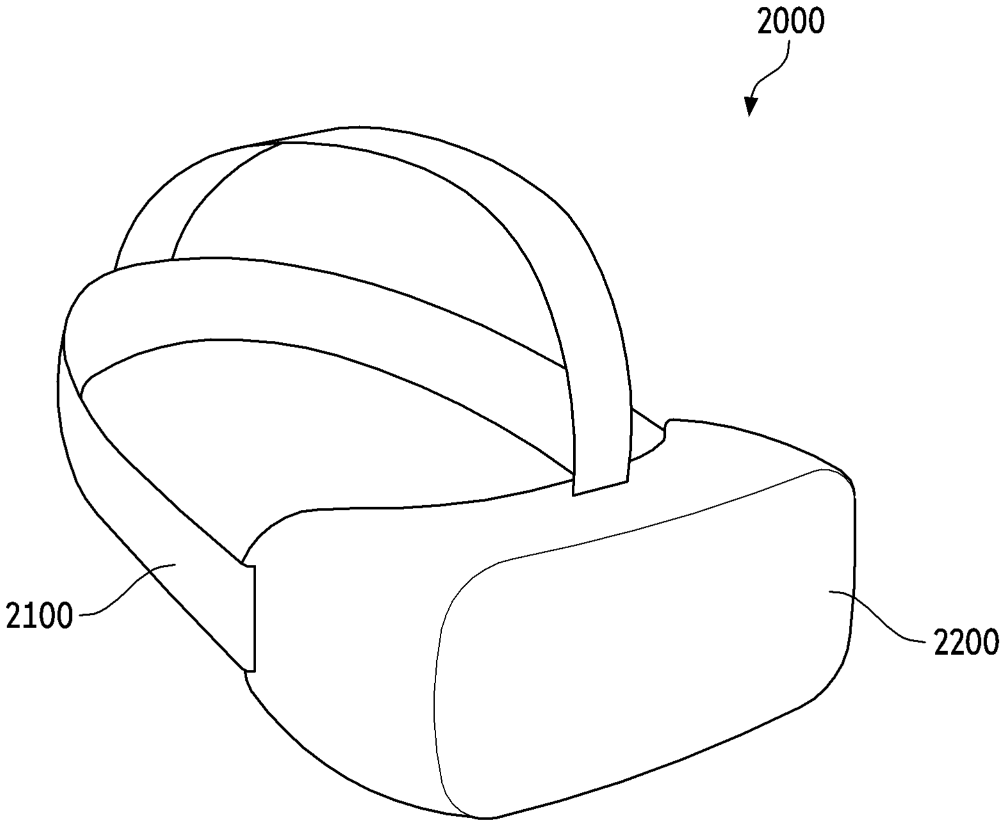

Referring to FIG. 10, the electronic device may be applied to a head mounted display device 2000. The head mounted display device 2000 may be a wearable electronic device which can be worn on the head of a user. For example, the head mounted display device 2000 may be a wearable device for virtual reality (VR) or mixed reality (MR). The head mounted display device 2000 may include a head mounted band 2100 and a display accommodating case 2200. The head mounted band 2100 may be connected to the display accommodating case 2200. The head mounted band 2100 may include a horizontal band and/or a vertical band, used to fix the head mounted display device 2000 to the head of the user. The horizontal band may be configured to surround a side portion of the head of the user, and the vertical band may be configured to surround an upper portion of the head of the user. However, embodiments are not limited thereto. For example, the head mounted band 2100 may be implemented in the form of a glasses frame, a helmet or the like within the spirit and the scope of the disclosure.

For example, the electronic device may be at least one of televisions, notebook computers, monitors, advertisement boards, Internet of things (IoTs), portable electronic apparatuses including mobile phones, smartphones, tablet personal computers (PCs), mobile communication terminals, electronic organizers, electronic books, portable multimedia players (PMPs), navigations, ultra mobile personal computers (UMPCs), smartwatches, watchphones, glasses-type displays, head-mounted displays (HMDs), instrument panels for automobiles, center fascias for automobiles, or center information displays (CIDs) on a dashboard, room mirror displays of automobiles, and displays of an entertainment system on a backside of front seats in automobiles.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. A scan driver comprising: a first scan driving circuit that sequentially outputs gate scan signals to scan signal lines during an active period for a frame, wherein the first scan driving circuit includes: an n-th stage that supplies a gate-on voltage to a pull-up node in response to a first gate control signal of a display driver circuit, where n is a positive integer; a plurality of output control parts that shares a pull-up node of the n-th stage and that sequentially outputs the gate scan signals during an enable period in which the gate-on voltage is supplied to the pull-up node; at least one carry output part that shares the pull-up node of the n-th stage and outputs at least one carry signal during the enable period; and at least one node voltage control part that controls a voltage magnitude of the gate-on voltage charged to the pull-up node during the enable period in response to a pull-up control signal of the display driving circuit, wherein the at least one node voltage control part is electrically connected to the pull-up node of the n-th stage and electrically shares the pull-up node, and adjusts the voltage magnitude of the pull-up node according to a change in voltage magnitude of the pull-up control signal input from the display driving circuit during the enable period of the pull-up node, and the display driving circuit varies the pull-up control signal to a first voltage magnitude greater than a selected magnitude of the gate-on voltage during an initial portion and a final portion of the enable period, and a second voltage magnitude substantially equal to the selected magnitude of the gate-on voltage during a middle portion of the enable period, and supplies the varied pull-up control signal to a pull-up control transistor during the enable period of the pull-up node.

2. The scan driver of claim 1, further comprising:

a second scan driving circuit that sequentially supplies sensing control signals to the sensing control lines during the active period for the frame based on a second gate control signal from the display driving circuit, wherein the second scan driving circuit sequentially supplies the sensing control signals to the sensing control lines arranged for each horizontal line to control a pixel driving voltage of each pixel for each horizontal line to be output to a data driving circuit.

3. The scan driver of claim 1, wherein a plurality of n-th stages are cascadedly connected to each other, and the plurality of output control parts are electrically connected to the pull-up node of the n-th stage to electrically share the pull-up node, and are connected in a series or parallel structure to the pull-up node of the n-th stage.

4. The scan driver of claim 3, wherein first to fourth output control parts of the plurality of output control parts sequentially output n-th to n+3-th gate scan signals to n-th to n+3-th gate lines, in response to first to fourth line select signals sequentially input in parts of at least one horizontal period during the enable period of the pull-up node.

5. The scan driver of claim 4, wherein each of the first to fourth output control parts includes a pull-up transistor and a pull-down transistor, and the pull-up transistor is turned on by the gate-on voltage of the pull-up node and outputs at least one line select signal input to a line select signal input terminal to each scan signal line.

6. The scan driver of claim 3, wherein the at least one carry output part is electrically connected to the pull-up node of the n-th stage and electrically shares the pull-up node, and outputs the at least one carry signal to stages disposed at a front end and a rear end in response to a carry select signal selectively input from the display driving circuit during the enable period of the pull-up node.

7. The scan driver of claim 6, wherein the at least one carry output part includes a pull-up transistor and a pull-down transistor, and the pull-up transistor is turned on by the gate-on voltage of the pull-up node and outputs the carry select signal input to the carry select signal input terminal to front-end and rear-end stages of a previous stage and a next stage.

8. The scan driver of claim 1, wherein the at least one node voltage control part includes:

a pull-up control transistor that is turned on by the gate-on voltage of the pull-up node and outputs the pull-up control signal input to a first electrode to a second electrode; and a pull-up capacitor having a first side electrode connected to the pull-up node and a second side electrode connected to the second electrode of the pull-up control transistor in a parallel structure with the pull-up control transistor.

9. The scan driver of claim 8, wherein the pull-up control transistor supplies the pull-up control signal from the display driving circuit to the second electrode of the pull-up capacitor, in case that the pull-up control transistor is turned on by the gate-on voltage of the pull-up node, and the pull-up capacitor maintains the voltage magnitude of the pull-up node connected to the first side electrode according to the voltage magnitude of the pull-up control signal input to the second side electrode.

10. The scan driver of claim 9, wherein the pull-up capacitor controls the voltage magnitude of the pull-up node according to the first voltage magnitude and the second voltage magnitude of the pull-up control signal input to the second side electrode.

11. A display device comprising: a plurality of pixels arranged in a display area of a display panel; a display driving circuit that controls data voltages supplied to the plurality of pixels and image display timing of the pixels; and a scan driver that drives scan signal lines and sensing control lines of the display panel during an active period for a frame, wherein the scan driver includes a first scan driving circuit that sequentially outputs gate scan signals to scan signal lines during an active period for the frame, and the first scan driving circuit includes: an n-th stage that supplies a gate-on voltage to a pull-up node in response to a first gate control signal of a display driver circuit; a plurality of output control parts that share a pull-up node of the n-th stage and sequentially output the gate scan signals during an enable period in which the gate-on voltage is supplied to the pull-up node; at least one carry output part that shares the pull-up node of the n-th stage and outputs at least one carry signal during the enable period; and at least one node voltage control part that controls a voltage magnitude of the gate-on voltage charged to the pull-up node during the enable period in response to a pull-up control signal of the display driving circuit, wherein the at least one node voltage control part is electrically connected to the pull-up node of the n-th stage and electrically shares the pull-up node, and adjusts the voltage magnitude of the pull-up node according to a change in voltage magnitude of the pull-up control signal input from the display driving circuit during the enable period of the pull-up node, and the display driving circuit varies the pull-up control signal to a first voltage magnitude greater than a selected magnitude of the gate-on voltage during an initial portion and a final portion of the enable period, and a second voltage magnitude substantially equal to the selected magnitude of the gate-on voltage during a middle portion of the enable period, and supplies the varied pull-up control signal to a pull-up control transistor during the enable period of the pull-up node.

12. The display device of claim 11, wherein a plurality of n-th stages are cascadedly connected to each other, and the plurality of output control parts are electrically connected to the pull-up node of the n-th stage to electrically share the pull-up node, and are connected in a series or parallel structure to the pull-up node of the n-th stage.

13. The display device of claim 12, wherein first to fourth output control parts of the plurality of output control parts sequentially output n-th to n+3-th gate scan signals to n-th to n+3-th gate lines, in response to first to fourth line select signals sequentially input in parts of at least one horizontal period during the enable period of the pull-up node.

14. The display device of claim 11, wherein the at least one node voltage control part includes:

a pull-up control transistor that is turned on by the gate-on voltage of the pull-up node and outputs a pull-up control signal input to a first electrode to a second electrode; and a pull-up capacitor having a first side electrode connected to the pull-up node and a second side electrode connected to the second electrode of the pull-up control transistor in a parallel structure with the pull-up control transistor.

15. The display device of claim 14, wherein the pull-up control transistor supplies the pull-up control signal from the display driving circuit to the second electrode of the pull-up capacitor, in case that turned on by the gate-on voltage of the pull-up node, and the pull-up capacitor maintains the voltage magnitude of the pull-up node connected to the first side electrode according to the voltage magnitude of the pull-up control signal input to the second side electrode.

16. An electronic device comprising: a display device comprising: a plurality of pixels arranged in a display area of a display panel; a display driving circuit that controls data voltages supplied to the plurality of pixels and image display timing of the pixels; and a scan driver that drives scan signal lines and sensing control lines of the display panel during an active period for a frame, wherein the scan driver includes a first scan driving circuit sequentially outputting gate scan signals to scan signal lines during an active period for the frame, and the first scan driving circuit includes: an n-th stage that supplies a gate-on voltage to a pull-up node in response to a first gate control signal of a display driver circuit; a plurality of output control parts that share a pull-up node of the n-th stage and sequentially output the gate scan signals during an enable period in which the gate-on voltage is supplied to the pull-up node; at least one carry output part that shares the pull-up node of the n-th stage and outputs at least one carry signal during the enable period; and at least one node voltage control part that controls a voltage magnitude of the gate-on voltage charged to the pull-up node during the enable period in response to a pull-up control signal of the display driving circuit, wherein the at least one node voltage control part is electrically connected to the pull-up node of the n-th stage and electrically shares the pull-up node, and adjusts the voltage magnitude of the pull-up node according to a change in voltage magnitude of the pull-up control signal input from the display driving circuit during the enable period of the pull-up node, and the display driving circuit varies the pull-up control signal to a first voltage magnitude greater than a selected magnitude of the gate-on voltage during an initial portion and a final portion of the enable period, and a second voltage magnitude substantially equal to the selected magnitude of the gate-on voltage during a middle portion of the enable period, and supplies the varied pull-up control signal to a pull-up control transistor during the enable period of the pull-up node.

* * * * *